(12) United States Patent
Stahl, III et al.

(10) Patent No.: US 6,571,398 B2
(45) Date of Patent: Jun. 3, 2003

(54) TRANSIT POSITIONING DEVICE FOR USE WITH MANHOLE MOUNT

(76) Inventors: Joseph E. Stahl, III, 190 Launfal La., Bozeman, MT (US) 59718; Michael J. Stahl, 7835 Flora Ave., St. Louis, MO (US) 63143

( * ) Notice: Subject to any disclaimer, the term of this patent is extended or adjusted under 35 U.S.C. 154(b) by 0 days.

(21) Appl. No.: 09/965,671

(22) Filed: Sep. 26, 2001

(65) Prior Publication Data

US 2003/0056382 A1 Mar. 27, 2003

(51) Int. Cl.[7] ............................................. F16M 11/12
(52) U.S. Cl. ............................. 3/333; 248/291.1; 33/14
(58) Field of Search .......................... 33/333, 290, 291, 33/292, 334, 419, 420, 421, 520; 248/219.4, 291.1, 284.1, 123.11, 121, 122.1, 124.1, 324, 326, 317

(56) References Cited

U.S. PATENT DOCUMENTS

| | | | | |
|---|---|---|---|---|
| 163,910 A | * | 6/1875 | Batchelder | 33/419 |
| 956,830 A | * | 5/1910 | Schmid | 33/290 |
| 1,462,545 A | * | 7/1923 | Higgin | 246/95.1 |
| 1,770,304 A | * | 7/1930 | Ferris | 33/421 |
| 3,776,496 A | * | 12/1973 | Reed | 248/182 |
| 3,985,326 A | * | 10/1976 | Kittstein | 248/226 A |
| 4,674,188 A | * | 6/1987 | Fisher | 33/1 H |
| 5,133,547 A | * | 7/1992 | Pardi | 273/1.5 R |
| 6,138,964 A | * | 10/2000 | Rose et al. | 248/123.11 |

OTHER PUBLICATIONS

SECO, Manhole Transit Tower and Laser Plummet (Redding, CA); overview, 5 pages of spec, 1 page of website date (Aug. 17, 1999).*

* cited by examiner

*Primary Examiner*—Diego Gutierrez
*Assistant Examiner*—Tania C. Courson
(74) *Attorney, Agent, or Firm*—Richard C. Conover

(57) ABSTRACT

A transit positioning device for use with a conventional manhole mount having an elongate vertical arm and an elongate horizontal arm orthogonally joined together at a joint. A transit holding platform is rotatably mounted to an end of an adjustable length elongate member which in turn is mounted to the horizontal arm of the manhole mount. Further, an adjustable length stabilizing arm is provided with one end hingedly connected to the vertical arm below the joint at a position spaced apart from the joint, and a second end hingedly connected to the horizontal arm at a position spaced apart from the joint.

7 Claims, 7 Drawing Sheets

TRANSIT POSITIONING DEVICE FOR USE WITH MANHOLE MOUNT

BACKGROUND OF THE INVENTION

The present invention relates to a transit positioning device for use with a conventional manhole mount. A transit is commonly used to make survey measurements for proper alignment of a pipeline with a manhole. This transit must be properly aligned over the center of a manhole and for this purpose, a manhole mount is used to locate the transit over this center. Various manhole mounts have been used to hold the transit above a center of the manhole. A portion of a conventional manhole mount is shown in FIG. 1. This manhole mount "A" includes a tubular vertical arm "B" and a tubular horizontal arm "C" joined together at a joint "D". The knob "E" allows the horizontal arm "C" to be adjustably positioned with respect to vertical arm "B". Vertical arm "B", at its lower end, has structure for mounting the manhole mount "A" to a manhole.

When the manhole mount is used for supporting a transit, a plumb bob may be used for positioning the transit directly over a target located at the bottom center of the manhole to which the pipeline is to be connected.

With conventional manhole mounts, it has been difficult to precisely position the plumb bob over the target. Crude adjustments are normally made, and it has been very time consuming to properly position the transit over the target.

The present invention overcomes these problems by providing a transit holding platform which is mounted to a manhole mount and is stabilized in a horizontal plane. A mechanism is provided with the platform to allow for precise positioning of the transit in orthogonal directions in the horizontal plane. With the transit precisely located directly above the target, surveying measurements can be taken to align a pipeline with the manhole.

SUMMARY OF INVENTION

A transit positioning device for use with a conventional manhole mount having an elongate vertical arm and an elongate horizontal arm orthogonally joined together at a joint. The positioning device includes a transit holding platform for mounting a transit at a pre-selected location on the platform. The platform is mounted to an end of an adjustable length elongate member which in turn is mounted to the horizontal arm of the manhole mount. A coupler is provided at the end of the elongate member adjacent the platform for rotatably securing the platform to the elongate member with an axis of rotation extending generally in a vertical direction and in spaced apart relation from the location where the transit is mounted. An indicator device, such as a plumb bob, is provided for indicating a position of the platform in the horizontal plane with respect to a target located at a bottom of the manhole. An adjustable length stabilizing arm is provided with one end hingedly connected to the vertical arm below the joint at a position spaced apart from the joint, and a second end hingedly connected to the horizontal arm at a position spaced apart from the joint. The stabilizing arm is used to position the horizontal arm of the manhole mount to extend in a horizontal plane.

With this arrangement, the stabilizing arm can be adjusted in length to position the transit holding platform in a horizontal plane. The length of the elongate member can be adjusted to position the transit holding platform over the target in a direction coaxial with the longitudinal axis of the horizontal arm. The platform can also be rotated about an arc centered on the coupler. With this arrangement, the platform can be easily positioned in the horizontal plane directly over a target located at a bottom of the manhole.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
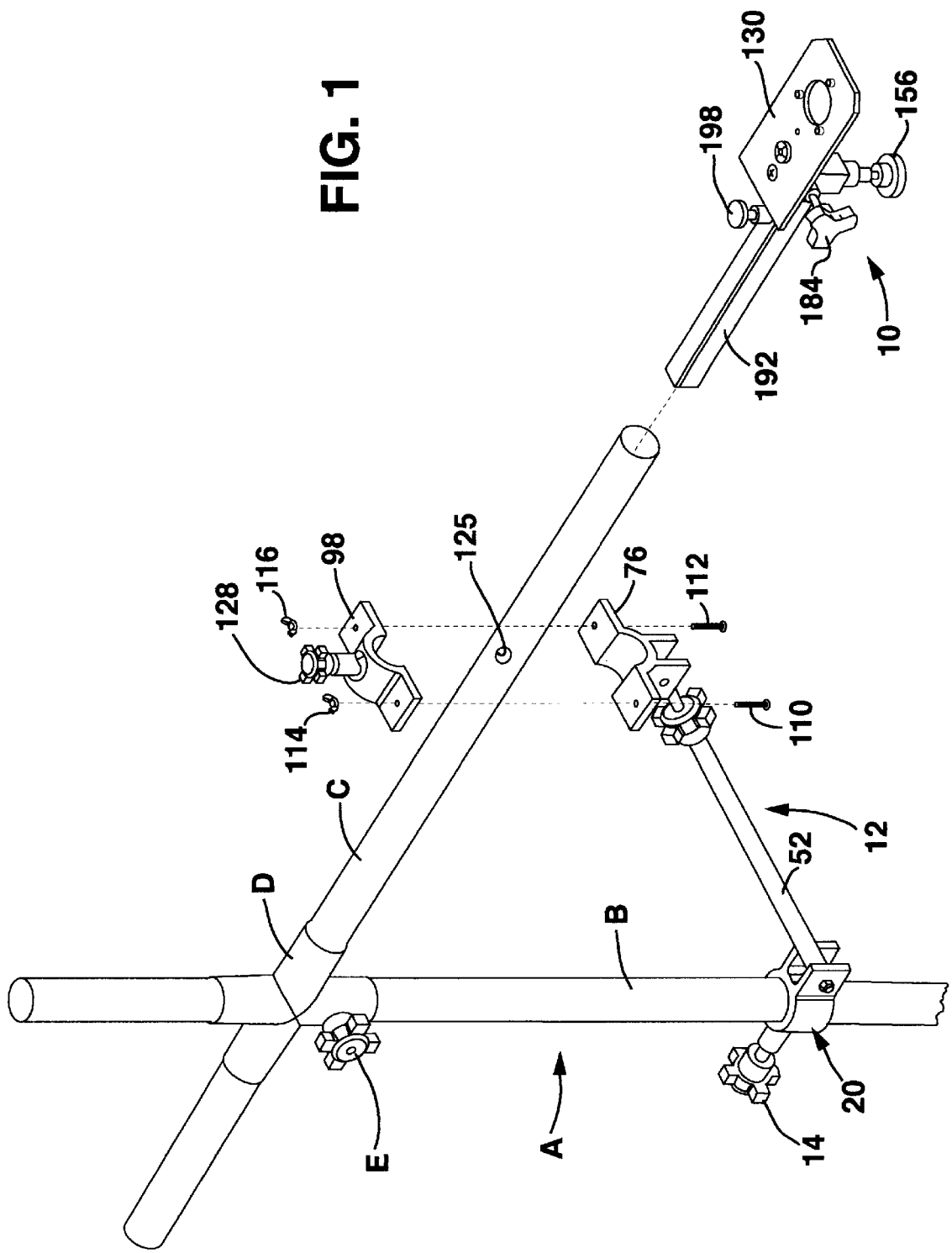
FIG. 1 is an exploded perspective view of the present invention mounted to a conventional manhole mount.

A transit positioning platform 10 and stabilizing arm 12, according to the present invention, are shown in FIG. 1 mounted to a conventional manhole mount "A".

Figure 2:
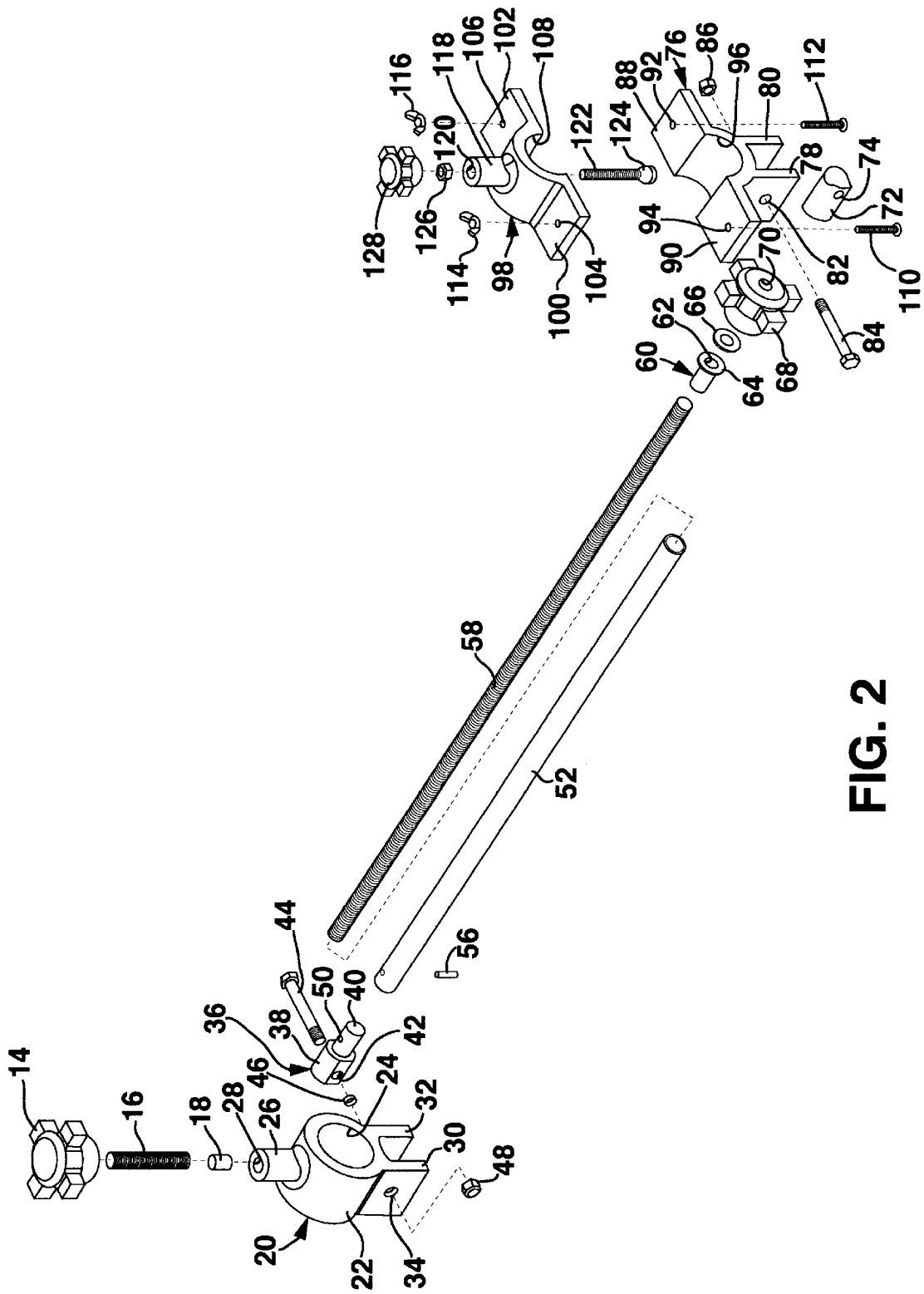
FIG. 2 is an exploded view of a stabilizing arm according to the present invention.
Figure 4:
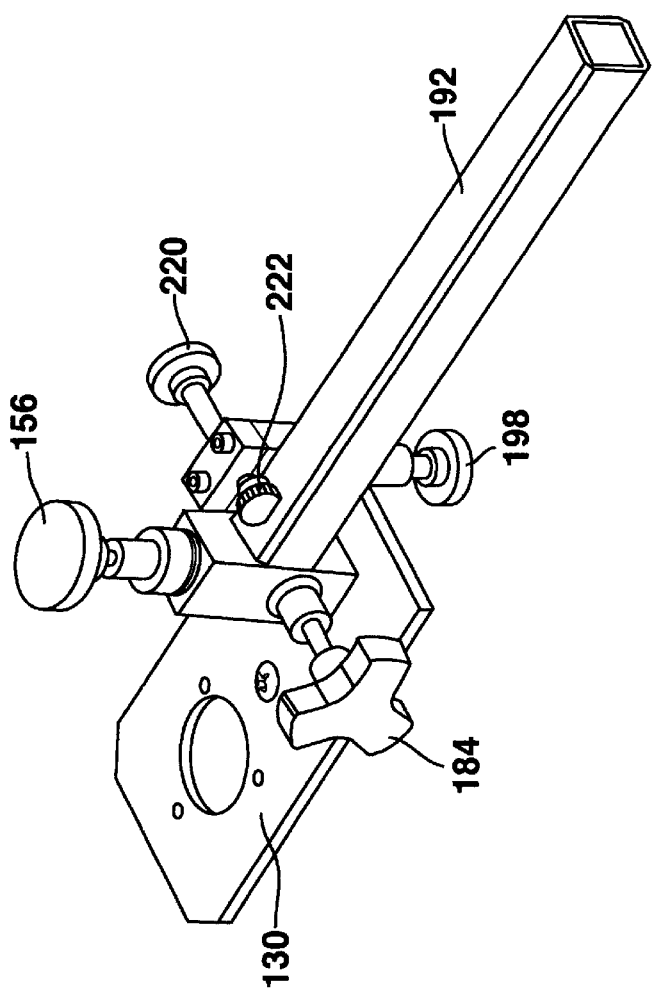
FIG. 4 is a perspective bottom view of the transit positioning platform according to the present invention.
Figure 3:
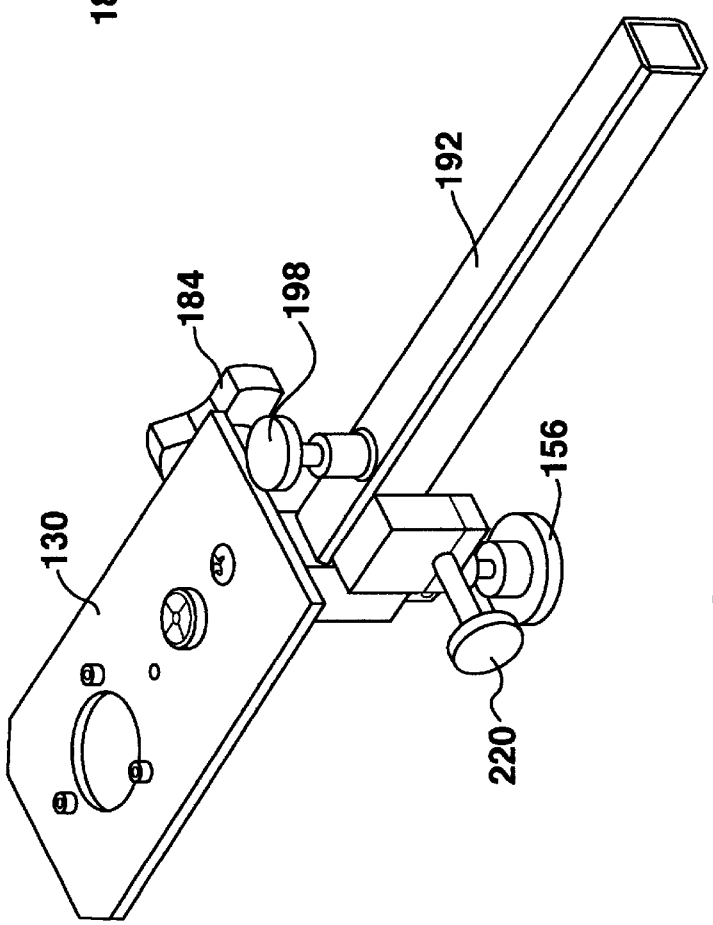
FIG. 3 is a perspective top view of a transit positioning platform according to the present invention.
Figure 5:
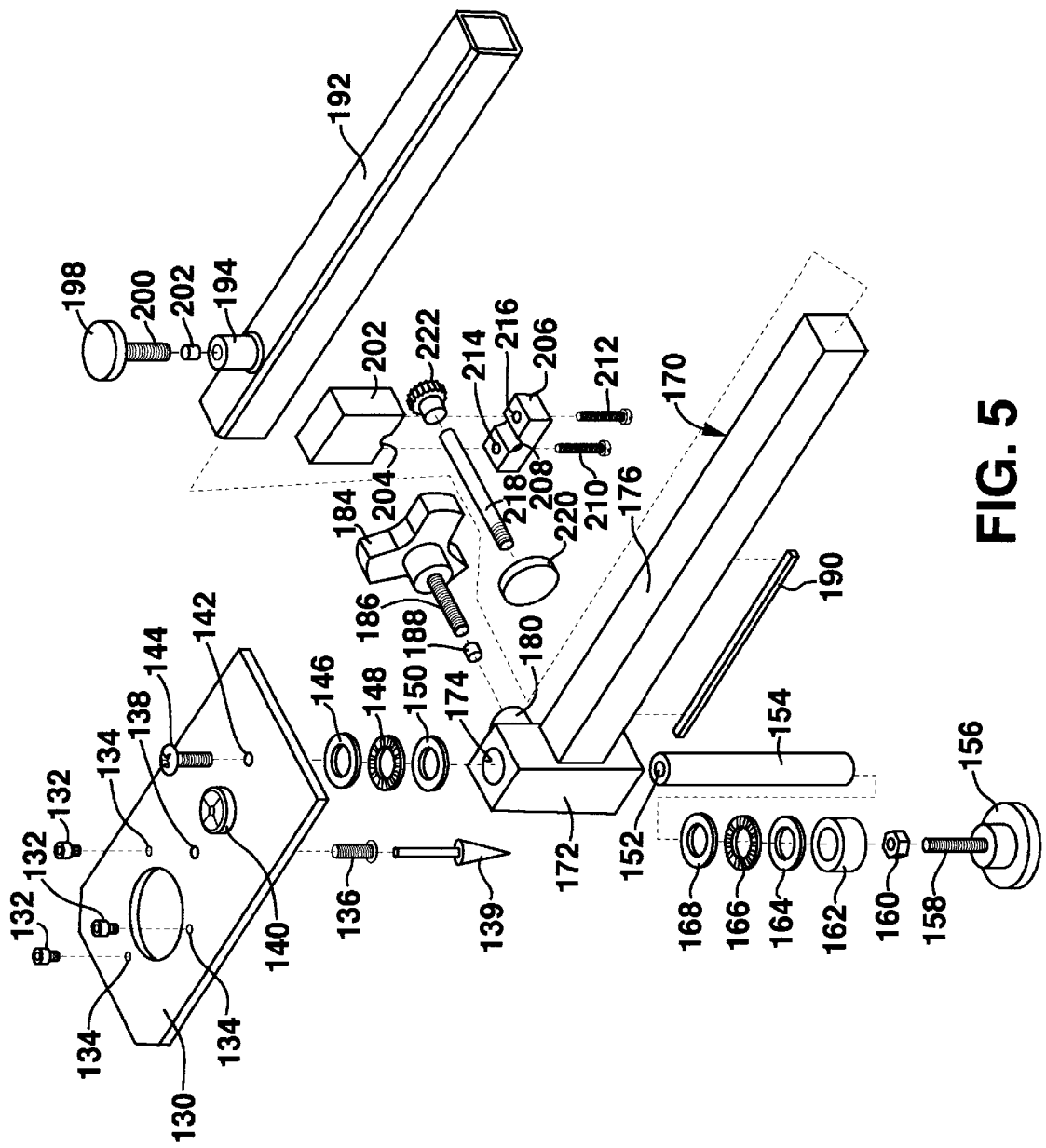
FIG. 5 is an exploded view of the transit positioning platform according to the present invention.

An exploded view of the stabilizing arm 12 is shown in FIG. 2. A threaded stud 16 has one end threadably secured to knob 14. The other end of stud 16 abuts a Teflon friction brake 18 to be received by a mounting bracket 20. The bracket 20 includes a tubular body 22 having an open interior 24 for receiving the vertical arm "B" of the manhole mount "A". A boss 26 is welded to the tubular body 22 at a position perpendicular to a longitudinal axis of the tubular body 22, as shown in FIG. 2. The boss 26 includes a threaded bore 28 sized to receive the Teflon brake 18 and threadably receive the threaded stud 16. The threaded bore 28 extends through a wall of tubular body 22 opening into the interior 24. With this arrangement, the friction brake 18 extends into the interior 24 of tubular body 22. By turning knob 14, the brake 18 engages the vertical arm "B" of manhole "A" to secure the bracket 20 to the vertical arm "B", as shown in FIG. 1.

The bracket 20 is further provided with a pair of mounting members 30 and 32. Each of the members 30 and 32 are provided with an axially aligned bore 34.

A sleeve mount 36 has a body portion 38 to which is attached a cylindrical, sleeve-receiving cylinder 40. The body 38 is provided with a transverse bore 42. A bolt 44 is provided which extends through bore 34 in member 32, through bore 42 of body 38, through a spacer 46, and then through bore 34 of member 30. A nut 48 threadably receives the bolt 44 to secure the sleeve mount 36 between the members 30 and 32.

The sleeve-receiving cylinder 40 is provided with a transverse bore 50. An elongate cylindrical sleeve 52 is inserted onto sleeve-receiving cylinder 40. Sleeve 52 is provided with a transverse bore 54 which is positioned to be coaxially aligned with bore 50 of the sleeve-receiving cylinder 40. A pin 56 is inserted through the bore 54 and bore 50 to secure sleeve 52 on the sleeve-receiving cylinder 40.

An elongate threaded shaft 58 is positioned inside sleeve 52 with an end of shaft 58 abutting pin 56. A bushing 60 is provided at an opposite end of shaft 58. Bushing 60 includes an axial bore 62 sized to slidably receive shaft 58. The bushing 60 is further provided with a flange 64 which abuts a washer 66. A knob 68 is provided with a threaded bore 70 which is sized to threadably receive the shaft 58. A shaft mounting bracket 72 has a threaded stop bore (not shown) axially extending within the shaft mount 72 for threadably receiving the shaft 58. The shaft mount 72 further includes a transverse bore 74.

A half-collar 76 includes a pair of mounting brackets 78 and 80. The bracket 78 includes a bore 82 for receiving a bolt 84. Bolt 84 extends through bore 82 of member 78, and then through the bore 74 of shaft mount 72. A nut threadably receives the bolt 84 to secure the shaft mount 72 between brackets 78 and 80.

The half-collar 76 is further provided with a pair of aligned mounting flanges 88 and 90. The flange 88 is provided with a bore 92, and the flange 90 is provided with a bore 94, as shown. Further, the half-collar 76 is provided with a semicircular concave portion 96.

A mating half-collar 98 includes two laterally extending flanges 100 and 102. The flange 100 is provided with a bore 104, and the flange 102 is provided with a bore 106. The half-collar 98 is further provided with a semi-circular concave portion 108. The semi-circular portion 96 of half-collar 76 and the semi-circular portion 108 of half-collar 98 are sized to receive the horizontal arm "C" of the manhole mount as shown in FIG. 1. The half-collars 76 and 98 are clamped together with bolts 110 and 112. The bolt 110 extends through bores 94 and 102 and is threadably received by wing nut 114. Bolt 112 extends through bores 92 and 106 and is threadably received with wing nut 116.

The half-collar 98 is further provided with a boss 118. The boss 118 includes a threaded bore 120 which extends through a bore (not shown) in a wall of half-collar 98 opening into the semi-circular portion 108. A threaded shaft 122 is threadably received by threaded bore 120. The shaft 122 includes a foot 124 to be positioned within the semi-circular portion 108. A jam nut 126 and a knob 128 threadably receive an end of shaft 122 opposite foot 124.

Figure 8:
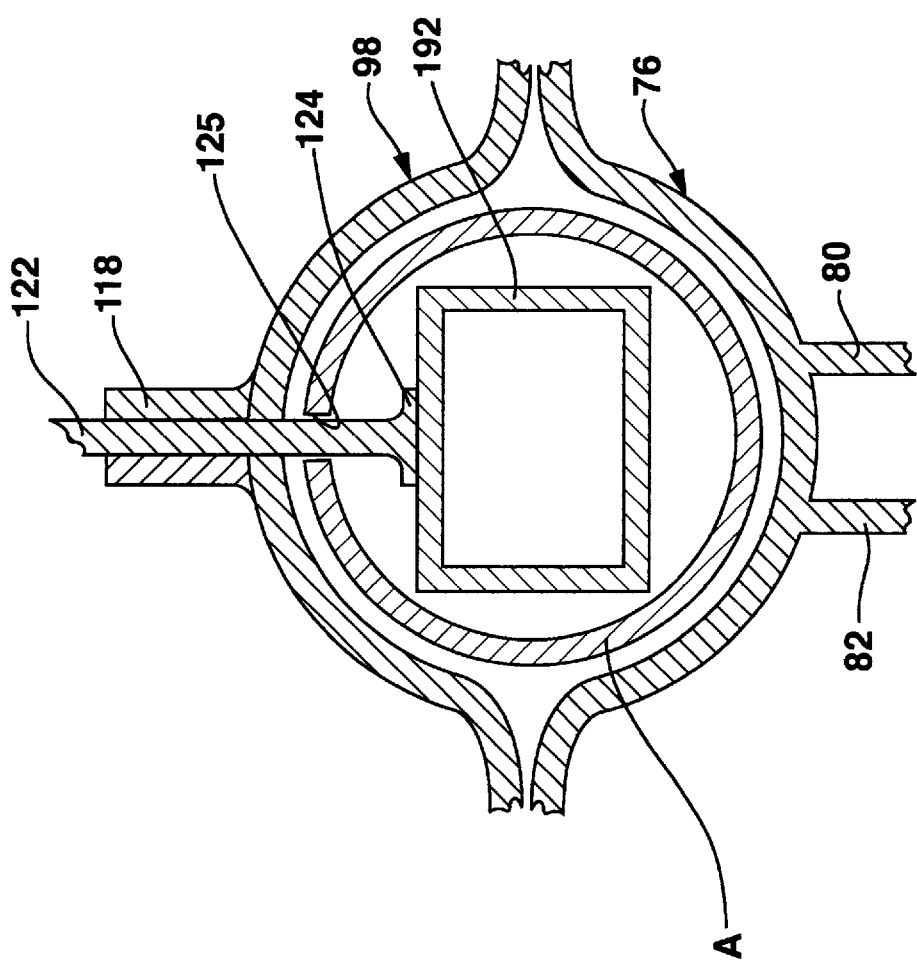
FIG. 8 is an unexploded cross-sectional view taken along line 8—8 shown in FIG. 1 with parts broken away.

The horizontal arm "C" of the manhole mount "A" is provided with a transverse hole 125 as shown in FIG. 8. When the collars 76 and 98 are to be clamped onto horizontal arm "C", the threaded shaft 122 with foot 124 is positioned to extend through this transverse hole 125 into the interior of the horizontal arm "C". By turning knob 128, the foot 124 may be forced against an arm of the positioning device 10, as described below, to secure positioning device 10 to the horizontal arm "C" of the manhole mount "A".

A transit positioning platform 10, according to the present invention, is shown in FIGS. 1, 3, 4 and 5. The positioning device 10 includes a transit mounting platform 130. Allen bolts 132, which are screwed into holes 134, are used to mount a transit (not shown) to platform 130. A plumb bob mounting screw 136, threaded into hole 138, is used for mounting a plumb bob 139 to platform 130. A target level 140 is glued to the platform 130. The platform 130 is further provided with a bore 142. A screw 144 extends through bore 142, a thrust washer 146, a needle thrust bearing 148, a thrust washer 150, and is threaded into a correspondingly threaded bore 152 axially provided in a round stock member 154.

A knob 156 is provided with a threaded stud 158. The threaded stud 158 is threadably received by a jam nut 160, and slidably received by locking collar 162, thrust washer 164, needle thrust bearing 166 and thrust washer 168. The stud 158 is threaded into a threaded bore (not shown) provided in and end of round stock 154 opposite threaded bore 152.

In assembling positioning device 10, the screw 144 is securely screwed into threaded bore 152, and threaded stem 158 is securely threaded into the corresponding bore in round stock 154. Thus, by turning knob 156, the round stock 154 is also rotated and, correspondingly, platform 130 is rotated.

A transit platform coupler 170 includes a main body portion 172. A bore 174 extends entirely through body 172 and is sized to slidably receive round stock 154. The coupler 170 is mounted to platform 130 with screw 144 at a position spaced apart from the location where the transit is mounted to the platform. Thus, when knob 156 is turned, the platform 130 and plumb bob 139 are moved on an arc centered on the round stock 154.

Figure 6:
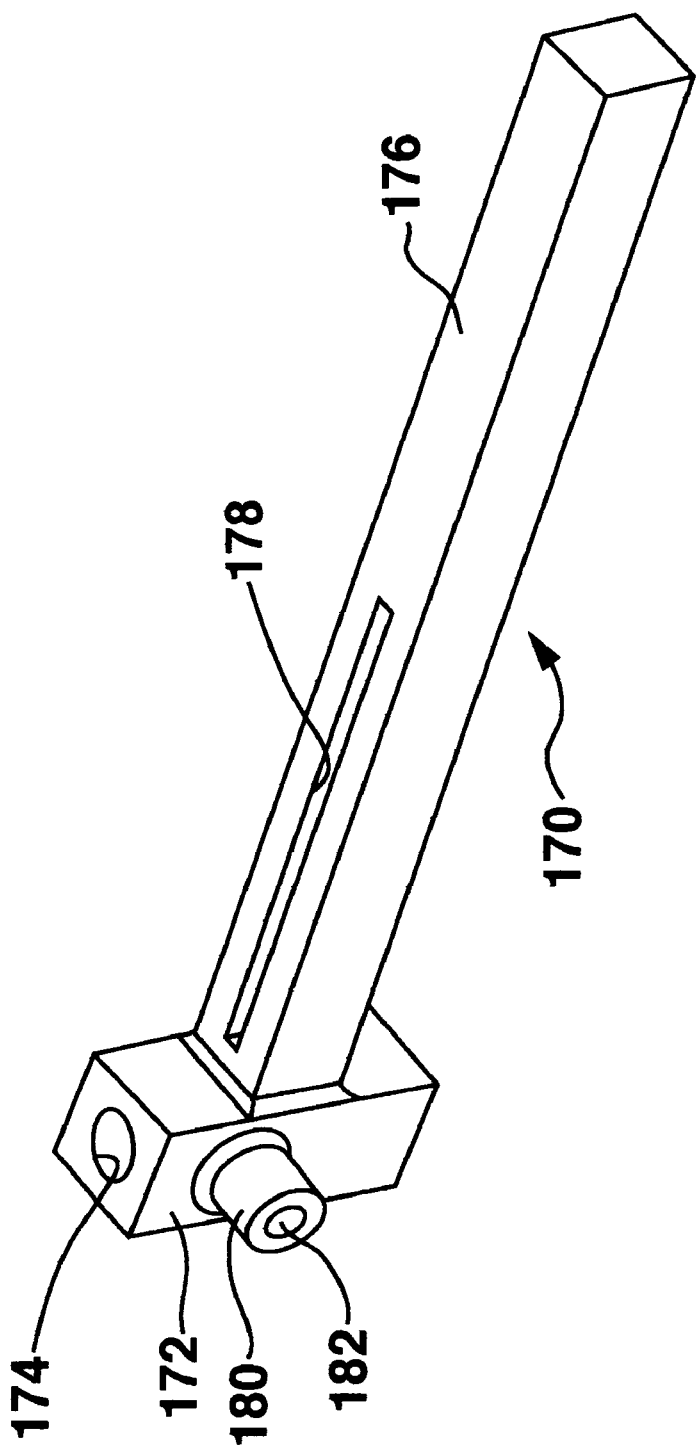
FIG. 6 is a detail perspective view of a platform support bar used with the transit positioning platform.

A bar 176 is secured, as by welding, to main body 172 and extends outwardly in a direction perpendicular to the longitudinal axis of hole 174. As shown in FIG. 6, the bar 176 is provided with an elongate groove 178. Further, the body 172 is provided with a tubular boss 180 which is welded to body 172, and extends in a direction perpendicular to the longitudinal axis of bore 174, and also perpendicular to bar 176, as shown in FIG. 6. The tubular boss 180 is provided with a threaded bore 182. The threaded bore 182 extends through the wall of body 172 into the bore 174. A knob 184 includes a threaded stud 186 which abuts a Teflon friction pad 188. The threaded bore 182 is sized to slidably receive pad 188 and threadably receive stud 186. The knob 184 is used for threadably forcing pad 188 into frictional engagement with round stock 154 to secure the round stock 154 at a selected position. In order to rotate round stock 154, and thus platform 130, the knob 184 is loosened enabling the round stock 154 to be rotated.

A gear rack 190 is frictionally forced into groove 178 located in bar 176.

A tubular sleeve 192 is sized to slidably receive bar 176. The sleeve 192 is provided with a tubular boss 194. The tubular boss includes a threaded bore 196. The bore 196 extends through a wall of sleeve 192, and opens into the interior of tube 192. A knob 198 includes a threaded stud 200 for pressing against a Teflon friction pad 201. The threaded stud and pad 201 are received by threaded hole 196. By rotating knob 198, friction pad 201 is forced against bar 176 to secure the bar 176 at a selected position within sleeve 192.

Figure 7:
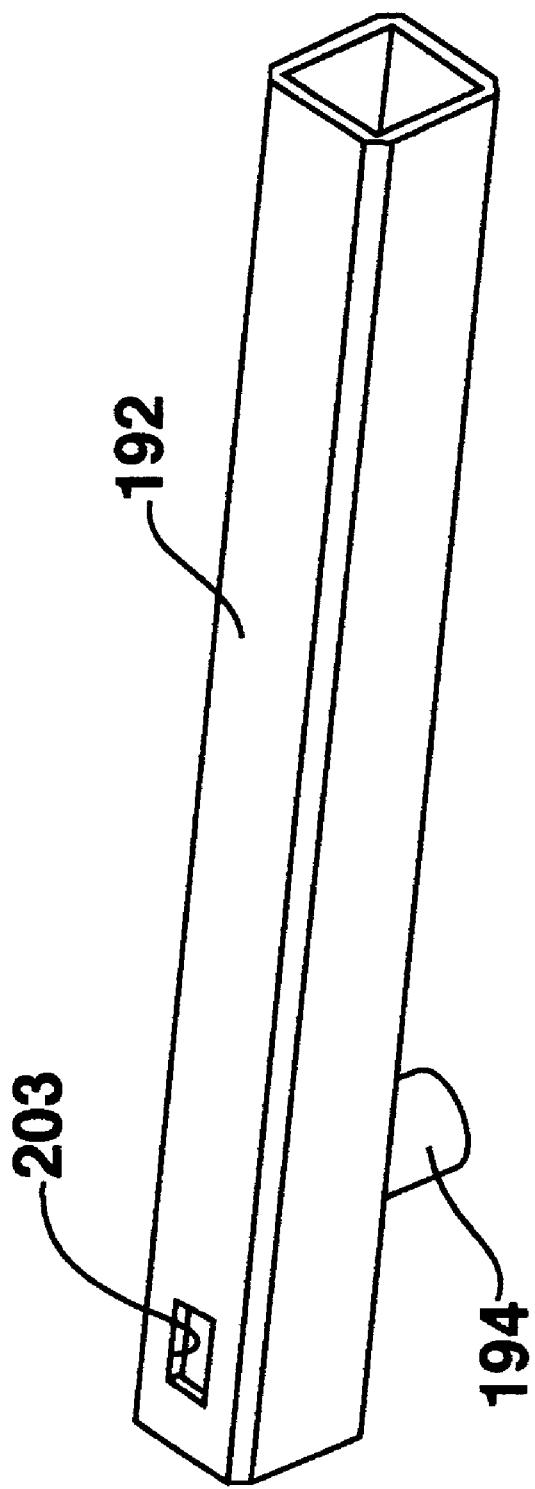
FIG. 7 is a detail perspective view of a sleeve used with the transit positioning platform.

A slot 203 is provided in a wall of sleeve 192, as shown in FIG. 7.

A half-pillow block 202 is secured to sleeve 192, as by welding. The half-pillow block 202 is provided with a semi-circular cutout 204. A mating half-pillow block 206 also has a semi-circular cutout 208 which, when aligned with cutout 204, provides a cylindrical opening through the pillow block formed by 202 and 206. The half-pillow block 206 is secured to half-pillow block 202 with bolts 210 and 212. The bolt 210 extends through a bore 214 and is received by a corresponding threaded hole (not shown) in half-pillow block 202. Correspondingly, bolt 212 extends through bore 216 provided in half-pillow block 206 and is received by a threaded hole (not shown) in half-pillow block 202. A shaft 218 is positioned inside mating semi-circular cutouts 204 and 208. A knob 220 is threadably secured to one end of shaft 218. At the opposite end of shaft 218, a round gear 222 is mounted with a frictional fit on shaft 218. The gear 222 is positioned to engage rack 190 through slot 203 provided in sleeve 192. By turning knob 22 with the gear 222 engaging rack 90, the position of bar 176 within sleeve 192 may be adjusted. Thus, the position of the plumb bob 139 can be easily adjusted in a direction coaxial with the longitudinal axis of the horizontal arm "C" of the manhole mount "A".

When using the present invention, the bracket 20 is mounted on the vertical arm "B" of the manhole mount "A" with the vertical arm "B" extending through opening 24. Knob 14 is loosened to permit inserting vertical arm "B" in opening 24. Next, the half-collars 76 and 98 are separated by removing wing nuts 114 and 116. The half-collar 98 is then positioned so that the shaft 122 with foot 124 is positioned in bore 125 located in horizontal arm "C" of manhole mount "A", as shown in FIG. 8. The half-collar 76 is then aligned with half-collar 98 so that bolts 110 and 112 may be extended through the appropriate bores. Wing nuts 114 and 116 are then used to secure the two half-collars 98 and 76 together. Knob 14 is then turned so that pad 18 tightly abuts the vertical stabilizing arm "B". In this manner, stabilizing arm 12 is mounted between vertical arm "B" and horizontal arm "C" of manhole mount "A", as shown in FIG. 1.

Next, sleeve 192 of the transit positioning platform 10 is inserted in the tubular horizontal arm "C" of manhole mount "A" and inserted to a sufficient depth so that the sleeve 192 goes slightly beyond the bore 125 provided in horizontal arm "C". The knob 128 is then turned to force foot 124 against the sleeve 192, as shown in FIG. 8, to secure sleeve 192 within tubular horizontal arm "C". The knob 68 of the stabilizing arm 12 is then turned to level the horizontal arm "C" using the level 140 as a guide. A plumb bob 139 is normally attached to the platform 130 of the transit positioning platform with screw 136, although other alignment devices could be used including laser instruments. In order to position the plumb bob over the target at the bottom of the manhole, knob 184 and knob 198 are loosened. By loosening knob 184, the platform can be rotated with knob 156. With knob 198 loosened, knob 220 can be turned to extend or retract the bar 176 from the sleeve 192 using the gear 222 riding in track 190. When the plumb bob is centered over the target, then knobs 184 and 198 are tightened to secure the platform 130 at the correct position. A transit is then mounted to the platform 130 with screws 132, and appropriate surveying measurements may be made.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

We claim:

1. A transit positioning device for use with a conventional manhole mount having an elongate vertical arm and an elongate horizontal arm orthogonally joined together at a joint and used to center the transit with respect to a manhole comprising:

a platform for supporting a transit at a preselected location on the platform;

an adjustable length elongate member having a first end mounted to a free end of the horizontal arm;

a coupler for rotatably securing the platform to a second end of the elongate member about an axis of rotation;

the axis of rotation extending generally in a vertical direction at a position spaced apart from the preselected location; and an indicator device for indicating a position of the platform in a horizontal plane with respect to a center of the manhole.

2. The transit positioning device according to claim 1 wherein the elongate member includes a bar together with a sleeve for slidably receiving the bar whereby the bar may be retracted into the sleeve or extended from the sleeve to adjust the length of the elongate member.

3. The transit positioning device according to claim 2 wherein the position of the bar with respect to the sleeve is adjusted with a rotatable gear secured to the sleeve meshing with a gear rack mounted to the bar.

4. The-transit positioning device according to claim 3 further including a first locking means for locking the bar and sleeve together at a selected position, and a second locking means for locking the platform at a selected rotated position.

5. The transit positioning device according to claim 4 further including an adjust able length stabilizing arm with one end hingedly connected to the vertical arm below the joint at a position spaced apart from the joint, and a second end hingedly connected to the horizontal arm at a position spaced apart from the joint.

6. The transit positioning device according to claim 5 wherein the stabilizing arm comprises:

an elongate threaded shaft having a first end and a free end;

the first end of the threaded shaft hingedly connected to the horizontal arm;

an elongate sleeve having a longitudinal axis and sized for slidably receiving the threaded shaft;

the sleeve having one end hingedly connected to the vertical arm;

the free end of the threaded shaft positioned inside the sleeve; and a threaded knob threadably receiving the threaded shaft;

the threaded knob positioned on the threaded shaft outside the sleeve and sized to be larger than a cross-section taken in a direction orthogonal to the longitudinal axis of the sleeve;

whereby the length of the stabilizing arm may be adjusted by rotating the knob in one direction to extend the threaded shaft from the sleeve or rotating the knob in an opposite direction to retract the shaft into the sleeve.

7. The transit positioning device according to claim 6 wherein the platform includes a level for indicating whether the platform is positioned in a horizontal plane.

* * * * *

UNITED STATES PATENT AND TRADEMARK OFFICE
CERTIFICATE OF CORRECTION

PATENT NO.      : 6,571,398 B2                                                Page 1 of 1
DATED           : June 3, 2003
INVENTOR(S)     : Joseph E. Stahl, III and Michael J. Stahl It is certified that error appears in the above-identified patent and that said Letters Patent is hereby corrected as shown below:

<u>Title page,</u>
Item [52], the U.S. Cl. "3/333" should be -- 33/333 --.

Signed and Sealed this

Twenty-fourth Day of June, 2003

JAMES E. ROGAN
*Director of the United States Patent and Trademark Office*